United States Patent
Cosmadopoulos et al.

(10) Patent No.: US 8,880,661 B2
(45) Date of Patent: Nov. 4, 2014

(54) MANAGEMENT OF DATA NODES IN AN APPLICATION SERVER

(75) Inventors: Ioannis Cosmadopoulos, San Francisco, CA (US); Ballav Bihani, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 757 days.

(21) Appl. No.: 13/078,555

(22) Filed: Apr. 1, 2011

(65) Prior Publication Data

US 2012/0254383 A1  Oct. 4, 2012

(51) Int. Cl.
*G06F 15/177* (2006.01)
*G06F 9/50* (2006.01)

(52) U.S. Cl.
CPC .................................. *G06F 9/5072* (2013.01)
USPC ......................................................... 709/221

(58) Field of Classification Search
CPC ............................. G06F 15/177; G06F 9/5072
USPC ......................................................... 709/221
See application file for complete search history.

(56) References Cited

U.S. PATENT DOCUMENTS

| | | |
|---|---|---|
| 2004/0215848 A1 | 10/2004 | Craddock et al. |
| 2005/0120160 A1 | 6/2005 | Plouffe et al. |
| 2008/0189432 A1 | 8/2008 | Abali et al. |
| 2010/0107172 A1 | 4/2010 | Calinescu et al. |
| 2010/0169494 A1 | 7/2010 | Machulsky et al. |
| 2012/0042034 A1 | 2/2012 | Goggin et al. |
| 2012/0254383 A1 | 10/2012 | Cosmadopoulos et al. |

OTHER PUBLICATIONS

Oracle Enterprise Manager Getting Started Guide for Oracle Coherence, Apr. 2009, 10g Release 5 (10.2.0.5), pp. 1-10.*
Oracle Enterprise Manager Concepts, Mar. 2009, 10g Release 5 (10.2.0.5), pp. 1-266.*
Oracle Enterprise Manager, Dec. 2009, 10g Release 5 (10.2.0.5), pp. 1-350.*
Clark, et al., "Live Migration of Virtual Machines", NSDI '05: $2^{nd}$ Proceedings of the Symposium on Networked Systems Design & Implementation, Jan. 1, 2005, pp. 273-286, UNSENIX Association, Berkeley, CA, United States.

* cited by examiner

*Primary Examiner* — Jung Park
*Assistant Examiner* — Albert Shih
(74) *Attorney, Agent, or Firm* — Meyer IP Law Group

(57) ABSTRACT

Described herein are systems and methods for managing nodes in a data grid from within an application server. The system includes an application server having an administrative user interface, and a data grid including a plurality of nodes operating as a cluster, wherein each node in the data grid has node attributes that define node functionality. A configuration repository provided by the application server is accessible to the administrative user interface, and stores configuration information used by the administrative user interface to directly manage the plurality of nodes in the data grid. Upon receiving interpreted configuration information from the application server at a node manager client on the application server, the node manager client modifies the operation of the plurality of nodes in the data grid by overriding node attributes according to the interpreted configuration information, wherein the plurality of nodes thereafter operate according to the configuration information.

20 Claims, 4 Drawing Sheets

MANAGEMENT OF DATA NODES IN AN APPLICATION SERVER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and application servers, and are particularly related to systems and methods for managing a data grid from within an application server.

BACKGROUND

A data grid (e.g., Coherence) is composed of nodes having node attributes that defines the functionality of each node. Typically, in an environment that includes an application server (e.g., a WebLogic Server or another application server) and a data grid, the nodes in the data grid have been managed separately from the application server (e.g., within the data grid), and the application server can not directly manage the nodes in the data grid. Additionally, there is no central location available to manage both the application server and the data grid. These are the areas that embodiments of the invention are intended to address.

SUMMARY

Described herein are systems and methods for managing nodes in a data grid (e.g., Coherence) from within an application server (e.g., a WebLogic or another application server). In accordance with an embodiment, the system includes a computer having an application server, wherein the application server includes an administrative user interface. In accordance with an embodiment, the system includes a data grid including a plurality of nodes operating as a cluster, wherein each node in the data grid has node attributes that define node functionality. In accordance with an embodiment, the system includes a configuration repository provided by the application server and accessible to the administrative user interface, wherein the configuration repository stores configuration information used by the administrative user interface to directly manage the plurality of nodes in the data grid. In accordance with an embodiment, the administrative user interface directs the application server to interpret the configuration information in the configuration repository, and communicate the interpreted configuration information to a node manager client on the application server. In accordance with an embodiment, upon receiving the interpreted configuration information, the node manager client uses the interpreted configuration information to modify the operation of the plurality of nodes in the data grid by overriding node attributes according to the interpreted configuration information. In accordance with an embodiment, the plurality of nodes thereafter operates according to the configuration information.

DETAILED DESCRIPTION

Described herein are systems and methods for managing nodes in a data grid (e.g., Coherence) from within an application server (e.g., a WebLogic or another application server). In accordance with an embodiment, the system includes a computer having an application server, wherein the application server includes an administrative user interface. In accordance with an embodiment, the system includes a data grid including a plurality of nodes operating as a cluster, wherein each node in the data grid has node attributes that define node functionality. In accordance with an embodiment, the system includes a configuration repository provided by the application server and accessible to the administrative user interface, wherein the configuration repository stores configuration information used by the administrative user interface to directly manage the plurality of nodes in the data grid. In accordance with an embodiment, the administrative user interface directs the application server to interpret the configuration information in the configuration repository, and communicate the interpreted configuration information to a node manager client on the application server. In accordance with an embodiment, upon receiving the interpreted configuration information, the node manager client uses the interpreted configuration information to modify the operation of the plurality of nodes in the data grid by overriding node attributes according to the interpreted configuration information. In accordance with an embodiment, the plurality of nodes thereafter operates according to the configuration information.

Figure 1:
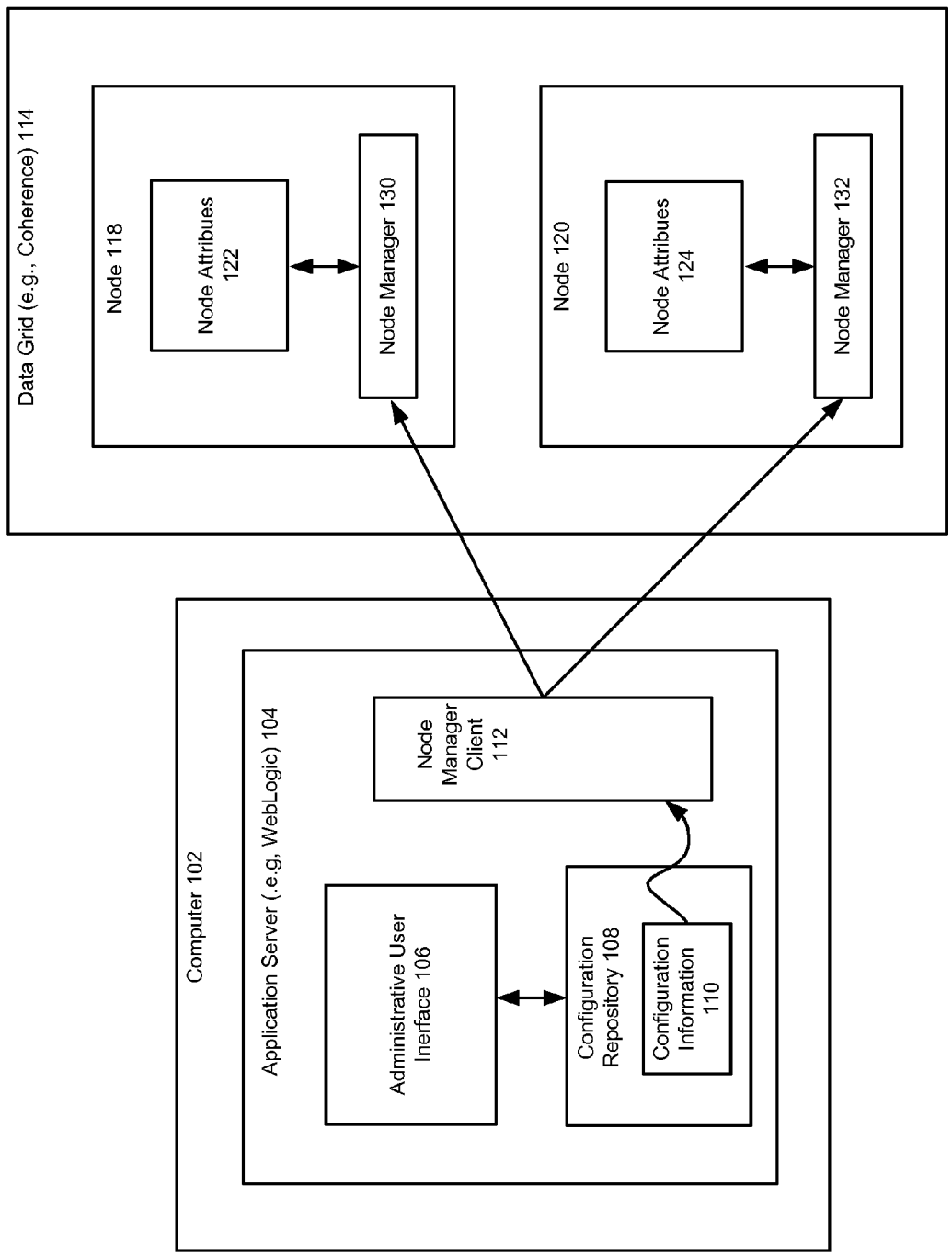
FIG. 1 shows an exemplary system for managing nodes in a data grid within an application server in accordance with an embodiment.

FIG. 1 shows an exemplary system for managing nodes in a data grid within an application server in accordance with an embodiment. As shown in FIG. 1, a computer 102 running an application server 104 (e.g., a WebLogic application server or another application server) includes an administrative user interface 106, a configuration repository 108 including configuration information 110, and a node manager client 112. As shown in FIG. 1, the system includes a data grid 114 having a plurality of nodes 118, 120 operating as a cluster, wherein each node in the data grid has node attributes 122, 124 that define node functionality, and a unique identification tag used to identify the node. This identification tag can be the address of the node (e.g., the machine IP of the node) in the data grid or another unique number used to identify the node. In accordance with an embodiment, a node manager 130,132 at each node is adapted to modify node attributes of the node it resides on using the configuration information on the application server.

In accordance with an embodiment, the administrative user interface can be accessed using a web interface (e.g., WebLogic Server Console), a scripting interface (e.g., WebLogic Server Scripting Tool), or another form of interface, and can used to manage node attributes of each node in the data grid. In accordance with an embodiment, the administrative user interface can include a GUI (e.g., in the form of a web interface) to allow a user to select, display and/or modify the node attributes of each node in the data grid. In accordance with an embodiment, node attributes such as multicast address/port, unicast address/port, and/or the ability to start, stop, suspend and automatically restart nodes can be set and modified using the GUI. For example, in accordance with an embodiment, the GUI can be used to select a node in the data grid, wherein selecting the node displays node attributes for the node that can be modified using the GUI. Upon modifying the node attributes for the selected node, configuration information representing the modification is saved in the configuration repository. In accordance with an embodiment, the input values used to write configuration information to a configuration repository can be phrased as:

---

An indication that node manager client is enabled: -
Dweblogic.nodemenager.ServiceEnabled=true. If false, then node manager client required files are not written to disk.
The server domain directory: -Dweblogic.domain.dir=$ServerDir
The server name:
-Dweblogic.nodemanager.Server.Name=$ServerName. This name is used for status and pid file
The Machine name will be passed to the coherence process as -D tangosol.coherence.machine

--- while the output values used to write information about node functionality can be phrased as:

---

Writing the PID to file:
$ServerDir/$ServerName/data/nodemanager/$ServerName.pid
Writing state transitions to file:
$ServerDir/$ServerName/data/nodemanager/$ServerName.state
Writing lock information to file:
$ServerDir/$ServerName/data/nodemanager/$ServerName.lck

---

In accordance with an embodiment, the configuration information can be saved in the form of a XML file (e.g., a tangosol-coherence-override.xml file) in a managed bean (e.g., a MBean), and can include specific values for each modified node, such as a unique identification tag identifying the modified node, and the configuration information representing the modifications made to the node. For example, in accordance with an embodiment, the MBean can be a Coherence Server Configuration MBean, Coherence Cluster Configuration MBean, Domain Configuration MBean and/or a Coherence Server Runtime MBean, wherein each MBean can be used by the administrative user interface to manage the nodes in the data grid. In accordance with an embodiment, a coherence server configuration MBean can include configuration information such as the unique identification tag of the node to be modified, configuration information used to modify the node attributes of the node to be modified, and the path (e.g., crosspath) of the node to be modified.

In accordance with an embodiment, the input values used to write configuration information to a coherence server configuration MBean can be phrased as:

---

```
public interface CoherenceServerMBean extends ConfigurationMBean {
    /**
     * <p>
     * The WebLogic Server host computer (machine) on which this server is
     * meant to run.
     * </p>
     * <p>
     * If you want to use a Node Manager to start this server, you must
     * assign the server to a machine and you must configure the machine
     * for the Node Manager.
     * </p>
     * <p>
     * You cannot change this value if a server instance is already
     * running.
     * </p>
     * @return The machine value
     * @configurable
     * @dynamic false
     */
    MachineMBean getMachine();
    /**
     * <p>
     * Sets the value of the Machine attribute.
     * </p>
     * @see #getMachine
     * @param machine The new machine value
     * @exception InvalidAttributeValueException
     */
    void setMachine(MachineMBean machine) throws
    InvalidAttributeValueException;
        /**
         * <p>Returns the ServerStartMBean that can be used to start up this
         * server remotely.</p>
         *
         * @return The serverStart value
         */
        CoherenceServerStartMBean getServerStart();
        /**
         * Associates the system-level Coherence cluster resource with this
         * server.
         * @param coherenceClusterSystemResource
         */
        void
    setCoherenceClusterSystemResource(CoherenceClusterSystemResourceMBean
    coherenceClusterSystemResource);
        /**
```

```
 * The system-level Coherence cluster resource associated with this
server.
    * @return CoherenceClusterSystemResourceMBean object
    */
    CoherenceClusterSystemResourceMBean
getCoherenceClusterSystemResource( );
```

In accordance with an embodiment, the coherence cluster configuration MBean can include a method CoherenceServerMBean[ ]getServers( ). In accordance with an embodiment, the domain configuration MBean can include a method CoherenceServerMBean[ ]getCoherenceServers( ) and the input values used to write configuration information to the domain configuration MBean can be phrased as:

```
/**
 * <p>The CoherenceServerMBeans that have been defined for this
domain.</p>
 * @dynamic true
 * @since 10.3.4.0
 * @return array of CoherenceServerMBean objects
 */
CoherenceServerMBean[ ] getCoherenceServers( );
/**
 * <p>This is the factory method for CoherenceServers that are
scoped
 * at the domain level. The short name which is specified must be
 * unique among all object instances of type. The new
CoherenceServer
 * which is created will have this Domain as its parent and must be
 * destroyed with the destroyCoherenceServer method.</p>
 *
 * @param name
 * @since 10.3.4.0
 * @return a server instance.
 */
CoherenceServerMBean createCoherenceServer(String name);
/**
 * Destroy the given CoherenceServer.
 * @since 10.3.4.0
 * @param bean - bean to destroy
 */
void destroyCoherenceServer(CoherenceServerMBean bean);
/**
 * Find a CoherenceServer with the given name.
 *
 * @since 10.3.4.0
 * @param name The name of the CoherenceServer
 * @return the bean with the given name, or null if none with that
 * name exist
 */
CoherenceServerMBean lookupCoherenceServer(String name);
```

In accordance with an embodiment, the coherence server runtime MBean can use a node manager client to start/stop nodes in the data grid, and the input values used to write configuration information to the coherence server runtime MBean can be phrased as:

```
 * <p>To start Coherence Managed Servers, you must first set up a
 * Node Manager on each Coherence Managed Server's host
machine.</p>
 * @customizer weblogic.server.CoherenceServerLifeCycleRuntime
 * @author Copyright (c) 2010 by Oracle. All Rights Reserved.
 * @roleAllowed Operator
 */
public interface CoherenceServerLifeCycleRuntimeMBean extends
RuntimeMBean,
    ServerStates {
    /**
    * <p>Uses the Node Manager to start a Coherence Managed
Server.</p>
    * @exception ServerLifecycleException If start operation
fails
    */
    public CoherenceServerLifeCycleTaskRuntimeMBean start( )
        throws ServerLifecycleException;
/**
 * <p>Immediately transitions a server to the
<code>SHUTDOWN</code>
 * state. The server immediately terminates all current work, moves
 * through the <code>SHUTTING_DOWN</code> state, and ends
in the
 * <code>SHUTDOWN</code> state.</p>
 *
 * <p>You can forcefully shut down a server from any state except
 * <code>UNKNOWN</code>.</p>
 *
 * @return
 * @exception ServerLifecycleException If force shutdown fails. */
    public CoherenceServerLifeCycleTaskRuntimeMBean
forceShutdown( )
        throws ServerLifecycleException;
    /**
    * Get preexisting Server Lifecycle Tasks
    * @return a list of all completed or pending server
lifecycle tasks.
    */
    public CoherenceServerLifeCycleTaskRuntimeMBean[ ]
getTasks( );
    /**
    * <p>The current state of the server.</p>
    * @return The state value
    */
    public String getState( );
    /**
    * Number of times the server has been restarted using the
NodeManager
    * since creation. The first start does not count.
    * The count is valid only if the NodeManager is used to
start and restart
    * the server every time.
    * @return Number of server restarts using the NodeManager
    */
    public int getNodeManagerRestartCount( );
    /**
    * @internal
    * @exclude
    */
    public void setState(String state);
    /**
    * <p>An integer that identifies the current state of the
server.
    * Values range from <code>0</code> to
<code>8</code>.</p>
    * @return The stateVal value
    * @exclude
    */
    public int getStateVal( );
    /**
    * Removes all
CoherenceServerLifeCycleTaskRuntimeMBeans that have
    * completed and been around for over 30 minutes.
    * @exclude
    */
    public void clearOldServerLifeCycleTaskRuntimes( );
}
```

In accordance with an embodiment, once the node attributes for the selected nodes are modified and saved to the configuration repository, the administration user interface directs the application server to interpret the configuration information in the configuration repository. The interpreted configuration information is communicated to a node manager client at the application server, wherein the node manager client is used to communicate the interpreted configuration information to the appropriate node manager on each node. In accordance with an embodiment, the node manager on each node modifies the operation of the node by overriding node attributes for the node according to the configuration information received, wherein thereafter each modified node operates according to the configuration information. For example, the node manager can be used to start, stop and restart nodes in the data grid. The input values used at the node manager client to start a node in the data grid can be phrased as:

```
$ServerDir/$ServerName/data/nodemanager/startup.properties
$ServerDir/$ServerName/data/nodemanager/$ServerName.pid.coh
$ServerDir/$ServerName/data/nodemanager/$ServerName.state.coh
``` while the output values used by the node manger client at the designated node to be started start can be phrased as:

```
$ServerDir/$ServerName/data/nodemanager/$ServerName.state.coh
$ServerDir/$ServerName/data/nodemanager/$ServerName.lck.coh
```

Additionally or alternatively, the node manager client is configured for fault detection and recovery of each node in the data grid. In accordance with an embodiment, the node manager client is also configured to take actions for input validation, as well as responding to abnormal situations at the data grid and/or external events.

Figure 2:
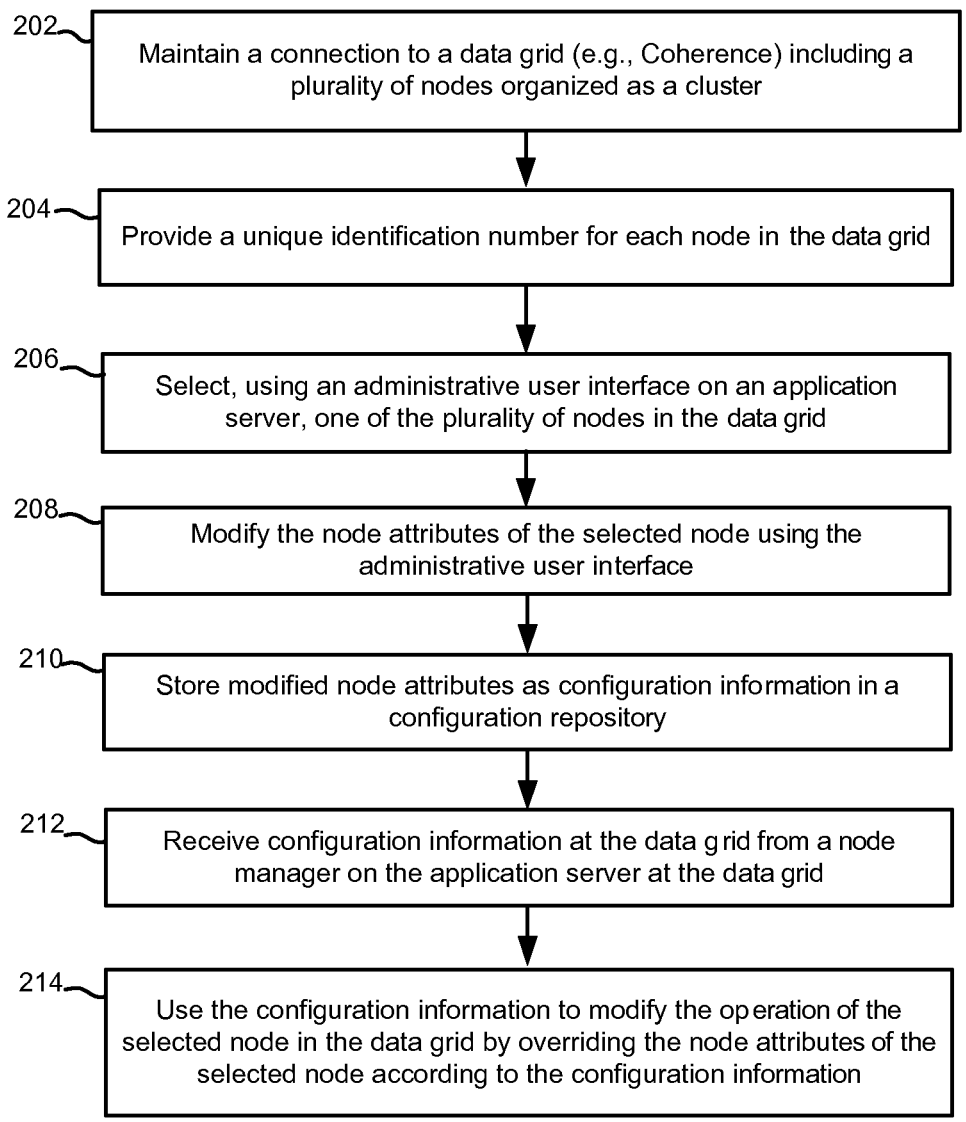
FIG. 2 shows a flowchart of a method in accordance with an embodiment, for managing nodes in a data grid within an application server.

FIG. 2 shows a flowchart of a method in accordance with an embodiment, of managing nodes in a data grid from within an application server. At step 202, a connection to a data grid (e.g., Coherence) is maintained, which includes a plurality of nodes operating as a cluster. In accordance with an embodiment, a node can be a computer (e.g., computer 102) having an application server (e.g., a WebLogic or another server) or virtual machine (e.g., a Java Virtual Machine) operating thereon. In accordance with an embodiment, each node has node attributes that define node functionality, such as multicast address/port, unicast address/port and/or the ability to start, stop, suspend, and automatically restart nodes.

At step 204, each node in the data grid is provided a unique identification tag. In accordance with an embodiment, the unique identification identifies the selected node, and modifications to the selected node are associated with that nodes unique identification tag. At step 206, an administrative user interface on an application server is used to select one of the plurality of nodes in the data grid, and upon selecting one of the nodes in the data grid, the node attributes for the selected node can be displayed and modified using the administrative user interface.

In accordance with an embodiment, the administrative user interface can be accessed using one of a web interface and a scripting interface to manage node attributes of each node in the data grid. For example, in accordance with an embodiment, the web interface, or generally the administrative user interface, can include a GUI that can be used to display and modify node attributes of each node in the data grid. In accordance with an embodiment, the GUI can be used to select one of the nodes in the data grid, and upon selecting one of the nodes in the data grid, the node attributes for the selected node can be displayed and modified from within the GUI.

At step 208, the node attributes of the selected node are modified using the administrative user interface. For example, in accordance with an embodiment the unicast listen port and/or multicast listen port can be modified for each selected node. Additionally, or alternatively, a node can be started, stopped, suspended or restarted using the administrative user interface. At step 210, the modified node attributes are stored as configuration information in a configuration repository. In accordance with an embodiment, the configuration information can be in the form of a XML file (e.g., a tangosol-coherence-override.xml file) in a managed bean (e.g., a MBean). In accordance with an embodiment, the file includes specific values for each selected node, including the unique identification tag for each modified node and the modified node attributes associated with each unique identification tag.

At step 212, the configuration information is received at the data grid from a node manager client on the application server at the data grid. In accordance with an embodiment, the node manger client on the application server communicates configuration information to a node manager on each node in the data grid, and the node manager on each node in the data grid uses the configuration information to modify the operation of the node by overriding node attributes according to the configuration information. For example, in accordance with an embodiment, the data grid identifies the node(s) to be modified by the identification tag(s) contained in the configuration information, and at step 214, the configuration information is used to modify the operation of the identified node(s) in the data grid by overriding the node attributes of the nodes according to the configuration information. In accordance with an embodiment, the modified node(s), thereafter operate according to the configuration information.

Figure 3:
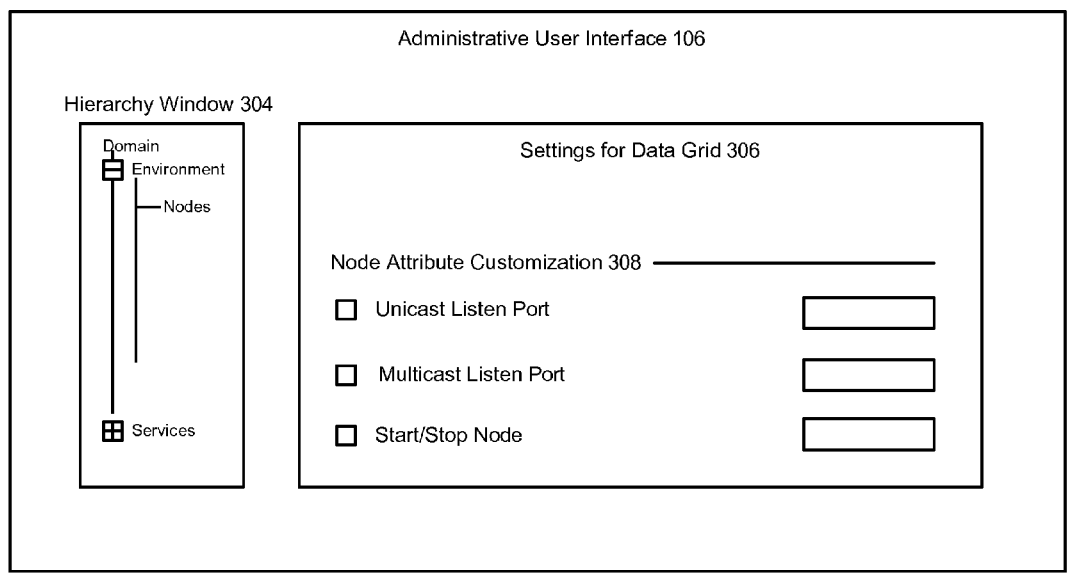
FIG. 3 shows an exemplary system for managing nodes in a data grid using an application user interface in accordance with an embodiment.

FIG. 3 shows an exemplary system for managing nodes in a data grid using an administrative user interface in accordance with an embodiment. As shown in FIG. 3, an administrative user interface 106 is provided. The administrative user interface can run on an application server (e.g., a WebLogic application server or another application server) and can be accessed using a web interface (e.g., WebLogic Server Console), a scripting interface (e.g., WebLogic Server Scripting Tool) or another type of interface. In accordance with an embodiment, administrative user interface can include a GUI used to manage the plurality of nodes. The GUI can include a hierarchy window 304 that can be used to display and select the plurality of nodes in the data grid.

In accordance with an embodiment, upon selecting one of the available nodes (e.g., node 1) in the data grid, the node attributes for that node are displayed in a node attribute viewing window 306. In accordance with an embodiment, the node attribute viewing window can be used to modify node attributes 308, such as unicast listen port and/or multicast listen port. Additionally, or alternatively, the selected node can be started, stopped, suspended or restarted from within the node attribute viewing window by modifying the appropriate node attribute (e.g., start/stop node attribute). In accordance with an embodiment, upon modifying node attributes for the selected node, configuration information representing the modifications is saved in a configuration repository on the application server. In accordance with an embodiment, the configuration information can be in the form of a XML file (e.g., a tangosol-coherence-override.xml file) that includes specific values for each selected node, including the unique identification tag for each selected node and the node attributes associated with each unique identification tag.

In accordance with an embodiment, once the node attributes for the selected nodes are modified, and saved to the configuration repository as configuration information, the administration user interface directs the application server to interpret the configuration information in the configuration repository. The interpreted configuration information is communicated to a node manager client on the application server, wherein the node manager client is used to communicate the interpreted configuration information to an appropriate node manager on each node. In accordance with an embodiment, the node manager on each node modifies the operation of the node by overriding node attributes according to the configuration information, wherein thereafter, each node operates according to the configuration information.

Figure 4:
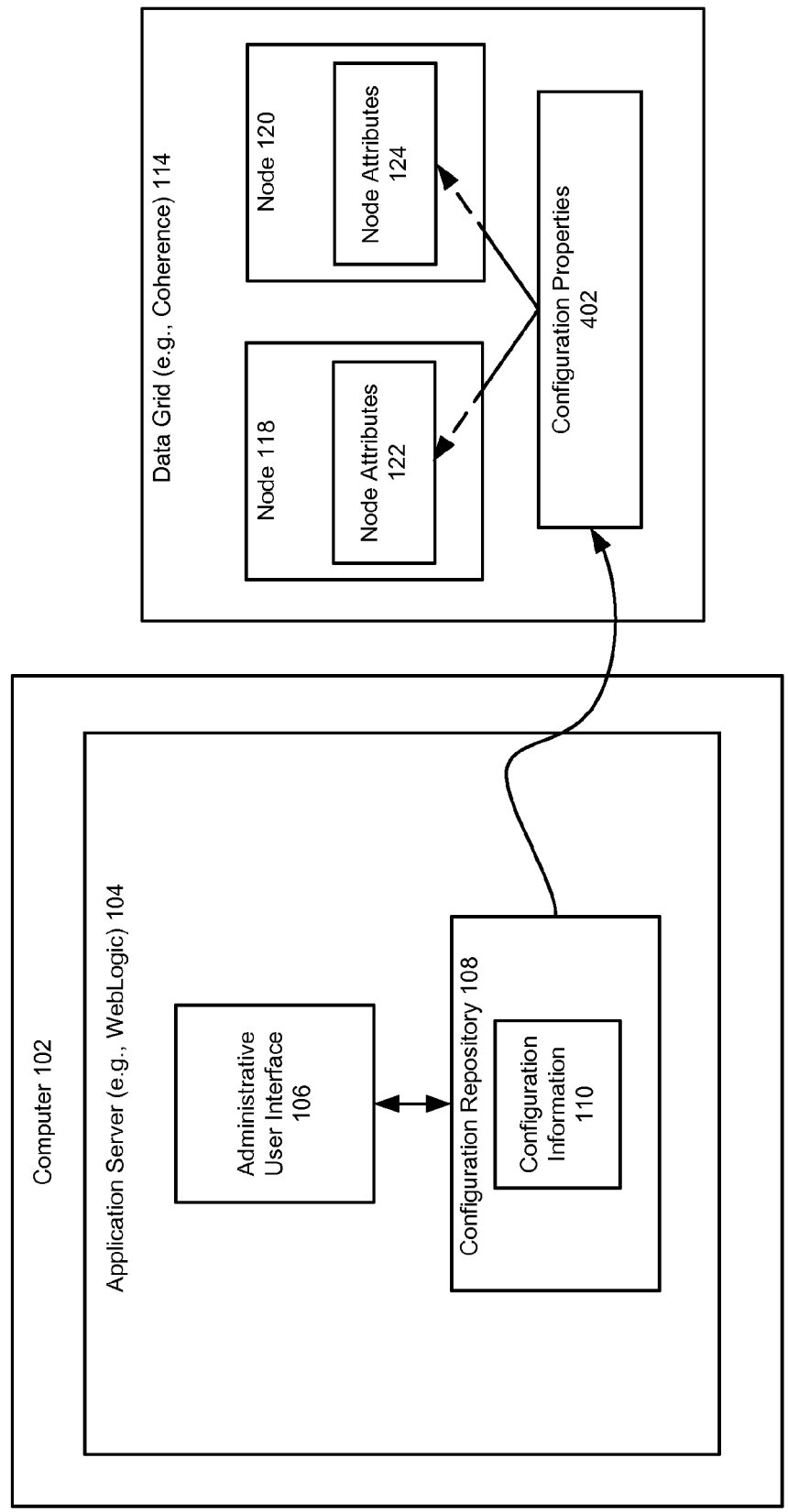
FIG. 4 shows an exemplary system for managing nodes in a data grid within an application server in accordance with an embodiment.

FIG. 4 shows an exemplary system for managing nodes in a data grid within an application server in accordance with an embodiment. As shown in FIG. 4, a computer running an application server (e.g., a WebLogic server or another application server) includes an administrative user interface. The system further includes a data grid having a plurality of nodes operating as a cluster, where each node in the data grid has node attributes adapted to define node functionality. In accordance with an embodiment, the node attributes for each node are set using configuration properties 402 stored on the data grid and provided by the application server.

In accordance with an embodiment, the administrative user interface is used to manage the data grid using configuration information stored in a configuration repository on the application server. In accordance with an embodiment, the administrative user interface can be accessed remotely, e.g., from a computer remote from the application server. Alternatively, the administrative user interface can be accessed from within the application server. In accordance with an embodiment, the administrative user interface includes a GUI to view, select and/or manage the plurality of nodes in the data grid.

In accordance with an embodiment, the configuration information can be used to declare node attributes for the plurality of nodes, such as multicast address/port and/or unicast address/port. In accordance with an embodiment, example configuration information can be in the form of a data grid system resource (e.g., a CoherenceClusterSystemResourceMBean). In accordance with an embodiment, the administrative user interface stores configuration information in the data grid system resource, and directs the application server to interpret the configuration information in the data grid system resource. In accordance with an embodiment, the administrative user interface modifies the operation of the plurality of nodes by overriding the data grid configuration properties according to the configuration information in the data grid system resource. Upon modifying the data grid configuration properties, the node attributes of the plurality of nodes are updated, and the plurality of nodes thereafter operate according to the configuration information.

Additionally, or alternatively, example configuration information can be in the form of a data grid runtime resource (e.g., a CoherenceClusterRuntimeMBean) that can be used by the administrative user interface to expose runtime information about the data grid, such as the size of the data grid (e.g., data size, number of nodes), and operating status of each node (e.g., active, not active). In accordance with an embodiment, the data grid system resource and the data grid runtime resource can be stored in the configuration repository on a computer readable storage medium, e.g., a WebLogic resource directory.

In accordance with an embodiment, the administrative user interface directs the application server to interpret the configuration information in the configuration repository, and to modify the operation of the plurality of nodes in the data grid by overriding data grid configuration properties according to the configuration information. Upon modifying the data grid configuration properties using the configuration information, the plurality of nodes thereafter operate according to the configuration information. For example, in accordance with an embodiment, the GUI can be used to select and display the current node attributes of one of the plurality of nodes in the data grid, and the displayed node attributes can be modified from within the GUI. In accordance with an embodiment, configuration information representing the modifications can be saved to the configuration repository, and once the configuration properties are modified and saved to the configuration repository, the administrative user interface can direct the application server to interpret the configuration information in the configuration repository, and to modify the operation of the selected node in the data grid by overriding the configuration properties of the selected node according to the configuration information. In accordance with an embodiment, the selected node thereafter operates according to the configuration information.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed:

1. A system for managing nodes in a data grid from within an application server, comprising:
   a data grid including a plurality of nodes wherein each node in the data grid has,
      node attributes that define node functionality,
      a node manager configured for modifying the node attributes,
      and a unique identifier for identifying the node;
   a computer which includes an application server;

a configuration repository provided by the application server and accessible to the administrative user interface, wherein the configuration repository stores node attributes for said plurality of nodes;

an administrative user interface provided on the application server wherein the administrative user interface is configured to display configuration information based on said node attributes to an administrative user and is configured to allow the administrative user to modify the node attributes stored in said configuration repository;

a node manager client provided on the application server and coupled to the node managers of said plurality of nodes;

wherein in response to modification of node attributes stored on the configuration repository for a node having a particular unique identifier, the node manager client communicates modified node attributes to the node manager for the node having the particular unique identifier, and the node manager overrides the node attributes for the node having the particular unique identifier with the modified node attributes; and whereby the administrative user is enable to directly manage configuration of the plurality of nodes of the data grid from the administrative user interface of the application server.

2. The system of claim 1 wherein the application server is a WebLogic server instance.

3. The system of claim 1 wherein the data grid is a Coherence data grid.

4. The system of claim 1 wherein the application server is a WebLogic server instance and the data grid is a Coherence data grid.

5. The system of claim 1 wherein the administrative user interface is accessed using one of a web interface and a scripting interface to manage node attributes of each node in the data grid.

6. The system of claim 1 wherein the administrative user interface includes a GUI to display node attributes of each node in the data grid, and wherein the GUI is used to select one of the plurality of nodes in the data grid, wherein upon selecting one of the plurality of nodes in the data gird, the GUI is used to select node attributes of the selected node, and modify the node attributes of the selected node, wherein the modified node attributes are saved to the configuration repository as configuration information and used to override the selected node's node attributes, and wherein the selected node thereafter operates according to the configuration information.

7. The system of claim 5 wherein the modified node attributes are stored in a form of a MBean.

8. A method of managing nodes in a data grid from within an application server, comprising:

maintaining a data grid including a plurality of nodes wherein each node in the data grid has, node attributes that define node functionality, a node manager configured for modifying the node attributes, and a unique identifier for identifying the node;

providing an application server;

providing a configuration repository provided on the application server and storing node attributes for said plurality of nodes in the configuration repository;

providing an administrative user interface on the application server wherein the administrative user interface;

displaying configuration information based on said node attributes to an administrative user using the administrative user interface on the application server;

allow the administrative user to modify the node attributes stored in said configuration repository using the administrative user interface on the application server;

providing a node manager client on the application server coupled to the node managers of said plurality of nodes wherein in response to modification of node attributes stored on the configuration repository for a node having a particular unique identifier, the node manager client communicates modified node attributes to the node manager for the node having the particular unique identifier, and the node manager overrides the node attributes for the node having the particular unique identifier with the modified node attributes; and whereby the administrative user is enable to directly manage configuration of the plurality of nodes of the data grid from the administrative user interface of the application server.

9. The method of claim 7 wherein the application server is a WebLogic server instance.

10. The method of claim 7 wherein the data grid is a Coherence data grid.

11. The method of claim 7 wherein the application server is a WebLogic server instance and the data grid is a Coherence data grid.

12. The method of claim 8 wherein the administrative user interface can be accessed using one of a web interface and a scripting interface to manage node attributes of each node in the data grid.

13. The method of claim 8 further comprising:

providing a GUI at the administrative user interface to display node attributes for each node in the data grid;

selecting one of the plurality of nodes in the data grid using the GUI; and modifying the node attributes of the selected node, wherein the modified node attributes are saved to the configuration repository as configuration information and used to override the selected node's node attributes, and wherein the selected node thereafter operates according to the configuration information.

14. The method of claim 12 wherein the modified node attributes are stored in a form of a MBean.

15. A non-transitory computer-readable storage medium storing one or more sequences of instructions for managing nodes in a data grid from within an application server, wherein said instructions, when executed by one or more processors, cause the one or more processors to execute the steps of:

maintaining a data grid including a plurality of nodes wherein each node in the data grid has, node attributes that define node functionality, a node manager configured for modifying the node attributes, and a unique identifier for identifying the node;

providing an application server;

providing a configuration repository provided on the application server and storing node attributes for said plurality of nodes in the configuration repository;

providing an administrative user interface on the application server wherein the administrative user interface;

displaying configuration information based on said node attributes to an administrative user using the administrative user interface on the application server;

allow the administrative user to modify the node attributes stored in said configuration repository using the administrative user interface on the application server;

providing a node manager client on the application server coupled to the node managers of said plurality of nodes wherein in response to modification of node attributes stored on the configuration repository for a node having a particular unique identifier, the node manager client communicates modified node attributes to the node manager for the node having the particular unique identifier, and the node manager overrides the node attributes for the node having the particular unique identifier with the modified node attributes.

16. The non-transitory computer readable storage medium of claim 15 wherein the application server is a WebLogic server instance.

17. The non-transitory computer readable storage medium of claim 15 wherein the data grid is a Coherence data grid.

18. The non-transitory computer readable storage medium of claim 15 wherein the application server is a WebLogic server instance and the data grid is a Coherence data grid.

19. The computer readable storage medium of claim 15 wherein the administrative user interface can be accessed using one of a web interface and a scripting interface to manage node attributes of each node in the data grid.

20. The computer readable storage medium of claim 15 further comprising:
providing a GUI at the administrative user interface to display node attributes for each node in the data grid;
selecting one of the plurality of nodes in the data grid using the GUI; and
modifying the node attributes of the selected node, wherein the modified node attributes are saved to the configuration repository as configuration information and used to override the selected node's node attributes, and wherein the selected node thereafter operates according to the configuration information.

* * * * *

UNITED STATES PATENT AND TRADEMARK OFFICE
CERTIFICATE OF CORRECTION

| | | |
|---|---|---|
| PATENT NO. | : 8,880,661 B2 | Page 1 of 1 |
| APPLICATION NO. | : 13/078555 | |
| DATED | : November 4, 2014 | |
| INVENTOR(S) | : Ioannis Cosmadopoulos et al. | |

It is certified that error appears in the above-identified patent and that said Letters Patent is hereby corrected as shown below:

Title Page 1, item (56) column 2, under OTHER PUBLICATIONS, line 9, delete "UNSENIX" and insert -- USENIX --, therefor.

In the drawings

Sheet 2 of 4, Figure 2, under Reference Numeral 214, line 1, delete "op eration" and insert -- operation --, therefor.

In the specification

Column 7, line 25, delete "manger" and insert -- manager --, therefor.

Column 8, line 24, delete "manger" and insert -- manager --, therefor.

In the claims

Column 14, line 4, Claim 19, delete "The computer" and insert -- The non-transitory computer --, therefor.

Signed and Sealed this
Thirty-first Day of May, 2016

Michelle K. Lee
*Director of the United States Patent and Trademark Office*